(12) United States Patent
Watanabe et al.

(10) Patent No.: US 6,941,214 B2
(45) Date of Patent: Sep. 6, 2005

(54) VEHICLE LATERAL MOVEMENT STABILIZING DEVICE

(75) Inventors: Takashi Watanabe, Asahi-machi (JP); Shoichi Masaki, Asahi-machi (JP); Moriharu Sakai, Asahi-machi (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/704,543

(22) Filed: Nov. 12, 2003

(65) Prior Publication Data

US 2004/0098186 A1 May 20, 2004

(30) Foreign Application Priority Data

Nov. 12, 2002 (JP) ........................................ 2002-328546

(51) Int. Cl.[7] .............................................. G06F 7/00
(52) U.S. Cl. ............................. 701/80; 701/41; 701/69; 701/70; 701/72
(58) Field of Search .............................. 701/41, 69, 70, 701/72, 74, 79, 80, 110; 180/421

(56) References Cited

U.S. PATENT DOCUMENTS 6,338,022 B1 * 1/2002 Shinmura et al. ........... 701/301
6,571,176 B1 * 5/2003 Shinmura et al. ........... 701/301

FOREIGN PATENT DOCUMENTS

| JP | 7-309101 A | 11/1995 |
| JP | 8-156760 A | 6/1996 |
| JP | 10-035460 A | 2/1998 |

\* cited by examiner

*Primary Examiner*—Gertrude A. Jeanglaude
(74) *Attorney, Agent, or Firm*—Burns, Doane, Swecker & Mathis LLP

(57) ABSTRACT

The aim is to stably control the lateral movement of a vehicle even on a road where the frictional coefficient is extremely small, such as on a frozen road, thereby improving the turnability and travelling stability. The device includes a frictional force adding means for increasing the frictional force of wheels to a road surface by scattering particulates and a controller which calculates the target lateral movement value and the actual lateral movement value based on the signals from wheel speed sensors, a steering angle sensor and a yaw rate sensor and actuates the right or left frictional force adding means according to the difference between these two values to increase the frictional force, thereby stabilizing the lateral movement.

8 Claims, 15 Drawing Sheets

VEHICLE LATERAL MOVEMENT STABILIZING DEVICE

BACKGROUND OF THE INVENTION

This invention relates to a vehicle lateral movement stabilizing device for controlling a brake assisting device for increasing the frictional force of the wheels or the vehicle to the road surface during braking so that the stability and turnability of the vehicle will improve.

On a frozen road on which the friction coefficient $\mu$ is extremely small, even if hard brakes are applied to the wheels, due to tire slip, it is difficult to obtain a sufficient frictional force to the road surface. On the other hand, use of spike tires are prohibited for the reason that they abrade roads and cause dust pollution. Thus, besides normal brakes (first braking force) that act on the wheels, a brake assisting device which increases the friction coefficient $\mu$ or effectively acts even if the friction coefficient $\mu$ is small is desired.

An ABS (antilock brake system), which is widely known as a system for efficient braking of wheels, is a system in which the reduced friction coefficient $\mu$ is recovered as much as possible by interrupting braking at short intervals to efficiently carry out braking. But on a frozen road or the like, since the friction coefficient $\mu$ is small, a system is desired which can stop the vehicle more effectively at a short braking distance.

As a measure to directly increase the friction coefficient $\mu$, a slip preventive assisting device is proposed by JP patent publication 7-309101 (publication 1). In the device of this publication 1, the friction coefficient $\mu$ is increased by scattering ice particles (or a mix of water and ice particles) between the tires and the road surface because if sand is scattered for slip prevention, this may cause dust pollution and environmental pollution.

As a means for effectively obtaining frictional force even with a low friction coefficient $\mu$, an emergency braking device is proposed by JP patent publication 8-156760 (publication 2). In the device of publication 2, a second braking means is provided which comprises a friction material which can directly engage the road surface and a hydraulic cylinder for operating the friction material. If the friction coefficient $\mu$ of the road surface is detected so small as to cause slip state by normal braking, the second braking means is activated to engage the friction material on the road surface to stop the vehicle.

The slip preventive assisting device of publication 1 can shorten the braking distance by scattering ice particles to increase the friction coefficient $\mu$ between the tires and the road surface. The emergency braking device of publication 2 also can shorten the braking distance by pressing the friction plate against the road surface to obtain frictional force of the vehicle for the road surface.

But either of the devices of publications 1 and 2 is used only to stop the vehicle by shortening the braking distance. No mention is made whatsoever as to how they are used to improve stability and turnability of the vehicle. Generally, during travel, a vehicle makes lateral movement in the range of the frictional force between the road surface and the tires when the steering wheel is operated. Thus, if the friction coefficient $\mu$ is extremely small, lateral movement of the traveling vehicle is significantly impaired, so that the travel stability and turnability of the vehicle will fall markedly. Thus, in order to improve travel stability and turnability, a measure to ensure lateral movement even on a road surface having a small friction coefficient $\mu$ such as frozen road has been desired. But such a proposal has never been made heretofore.

An object of this invention is to provide a lateral movement stabilizing device by which the frictional force of the wheels or the vehicle to the road surface can be increased with simple members, lateral movement of the vehicle is ensured, thereby improving travel stability and turnability.

SUMMARY OF THE INVENTION

According to this invention, there is provided a vehicle lateral movement stabilizing device comprising frictional force adding means having an actuator and an actuated member for increasing the frictional force of wheels to a road surface by driving the actuated member by the actuator, various sensors or switches including wheel speed sensors, for detecting signals indicating movement and/or turning of the wheels or the vehicle, a controller for controlling the actuation of the actuator based on signals from the sensors, the controller including a lateral movement evaluating portion for calculating by computing values indicating a lateral movement state including movement and turning of the vehicle based on detection signals from the sensors, determining whether the lateral movement value is not less than or not more than a predetermined reference value, and evaluating the lateral movement, the controller sending a control signal based on the results of evaluation to the frictional force adding means to increase the frictional force, whereby controlling the lateral movement in a stable state.

With this vehicle lateral movement stabilizing device, even on a road surface on which the friction coefficient $\mu$ of the wheels for the road surface is small, lateral movement during travel or braking stabilizes. To the controller, input signals are sent from various sensors after the start of travel. From these signals, a state amount indicating the travel speed and lateral movement of the vehicle is computed. And if the state amount is not less than or not more than a predetermined reference value, the steering amount is too much or too little in spite of the fact that the steering wheel has been operated.

Thus, the controller sends a control signal to the frictional force adding means to actuate it, thereby increasing the frictional force. At this time, if the frictional force adding means are of a type in which particulates are scattered, the value of the friction coefficient $\mu$ is recovered by changing the surface state between the wheels and the road surface to increase the frictional force. Also, if the frictional force adding means is of a type that uses a friction plate, frictional force is obtained by pressing the friction plate against the road surface. Thus, either type can be used. At the start of the vehicle or during travel or braking, by obtaining the frictional force for the road surface, the turning movement is effectively suppressed, so that stable turnability and travelabilty are achieved.

In this lateral movement stabilizing device, the frictional force adding means may be means which increase the frictional force of the wheels to the road surface by driving actuated members by actuators to change the surface state between the tires and the road surface by scattering the particulates. Also in this case, the actuated members for scattering particulates may be injection nozzles for injecting the particulates, and the frictional force adding means may be structured to supply compressed air from a motor-driven air pump to particle containers for storing the particulates by means of actuators through solenoid valves to blow the particulates through the injection nozzles by means of the compressed air.

The controller may be adapted to receive input signals from wheel speed sensors, a steering angle sensor, and a yaw rate sensor, compute the turning angular speed value of the target lateral movement from the wheel speeds and the steering angle, compute the turning angular speed of the actual lateral movement from the actually measured value of the yaw rate, and evaluate lateral movement by determining that the deviation is not less than or not more than a predetermined value. Otherwise, the controller may be adapted to receive input signals from the wheel speed sensors and a steering angle sensor and evaluate lateral movement by determining whether the steering angle or the added steering speed is not less than a predetermined value, or the wheel return speed is not less than a predetermined value.

This lateral movement stabilizing device may be a stabilizing device which carries out cooperative control by the following combinations.

That is, the vehicle lateral movement stabilizing device may comprise a first control means for controlling wheel braking force during braking of a vehicle, such as an ABS, and a second control means for controlling frictional engagement between wheels and a road surface, whereby controlling the lateral movement of the vehicle by cooperatively controlling the first control means and the second control means.

Also, the vehicle lateral movement stabilizing device may comprise a first control means for controlling wheel braking force during turning of a vehicle, such as a VSC, and a second control means for controlling frictional engagement between wheels and a road surface, whereby controlling the lateral movement of the vehicle by cooperatively controlling the first control means and the second control means.

Also, the vehicle lateral movement stabilizing device may comprise a first control means for controlling wheel driving force during acceleration of a vehicle, such as a TRC, and a second control means for controlling frictional engagement between wheels and a road surface, whereby controlling the lateral movement of the vehicle by cooperatively controlling the first control means and the second control means.

The vehicle lateral movement stabilizing device may comprise a first control means for controlling distribution of the driving force to front and rear wheels during turning of a vehicle, and a second control means for controlling frictional engagement between wheels and a road surface, whereby controlling the lateral movement of the vehicle by cooperatively controlling the first control means and the second control means.

In the lateral movement stabilizing device of any of these combinations, according to whether the friction coefficient $\mu$ of the road surface is a normal value or low, even if control is impossible with the first control means, it is covered by the control by the second control means. Thus stable lateral movement is achieved. The first control means such as an ABS comprises a first brake means for braking the rotation of the wheels, and a controller for ABS-controlling the first brake means. The first brake means is wheel brake cylinders and a hydraulic circuit including solenoid valves and a hydraulic pump for feeding hydraulic pressure thereto. The ABS controller is a control circuit including a program for carrying out ABS control through the solenoid valves and the motor of the hydraulic pump.

Further, the second control means is a control circuit including the frictional force adding means and a program for controlling the frictional force adding means. Also, the first control means for VSC, TRC and driving force distribution control is one in which the ABS controller of the first control means for an ABS is replaced with a VSC controller, TRC controller or 4WD controller. The second control means is the same as the one which carries out cooperative control with the first control means for an ABS.

The frictional force adding means in the lateral movement stabilizing device may be combined with an ABS (antilock brake), VSC (travel stabilizing device) and TRC (traction control device) to provide a vehicle movement stabilizing device of the following configuration.

The vehicle movement stabilizing device may comprise a travel assisting means which, at the start of a vehicle, or during travel or braking for stopping, through brake means for braking the rotation of wheels and an output adjusting portion for adjusting the engine output, effectively actuates various operations by controlling braking or braking and the engine output, frictional force adding means having an actuator and an actuated member for increasing frictional force and driving the actuated member by the actuator to increase the frictional force of the wheels to a road surface, and a controller for controlling the operation of the travel assisting means and the frictional force adding means, the controller including an evaluating portion for determining whether or not it exceeds a movement limit value for effectively actuating the respective movements by the travel assisting means, based on the friction coefficient of the wheels to the road surface during each movement, and actuating the frictional force adding means if it determines that the movement limit value is exceeded.

In this vehicle movement stabilizing device, control is carried out so that overall vehicle movements including start, travel and stopping of the vehicle will stabilize. In this stabilizing control, the evaluating unit of the controller judges whether or not the frictional coefficient has dropped below a limit value at which the motion is uncontrollable by adjusting the first braking force and the engine output.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
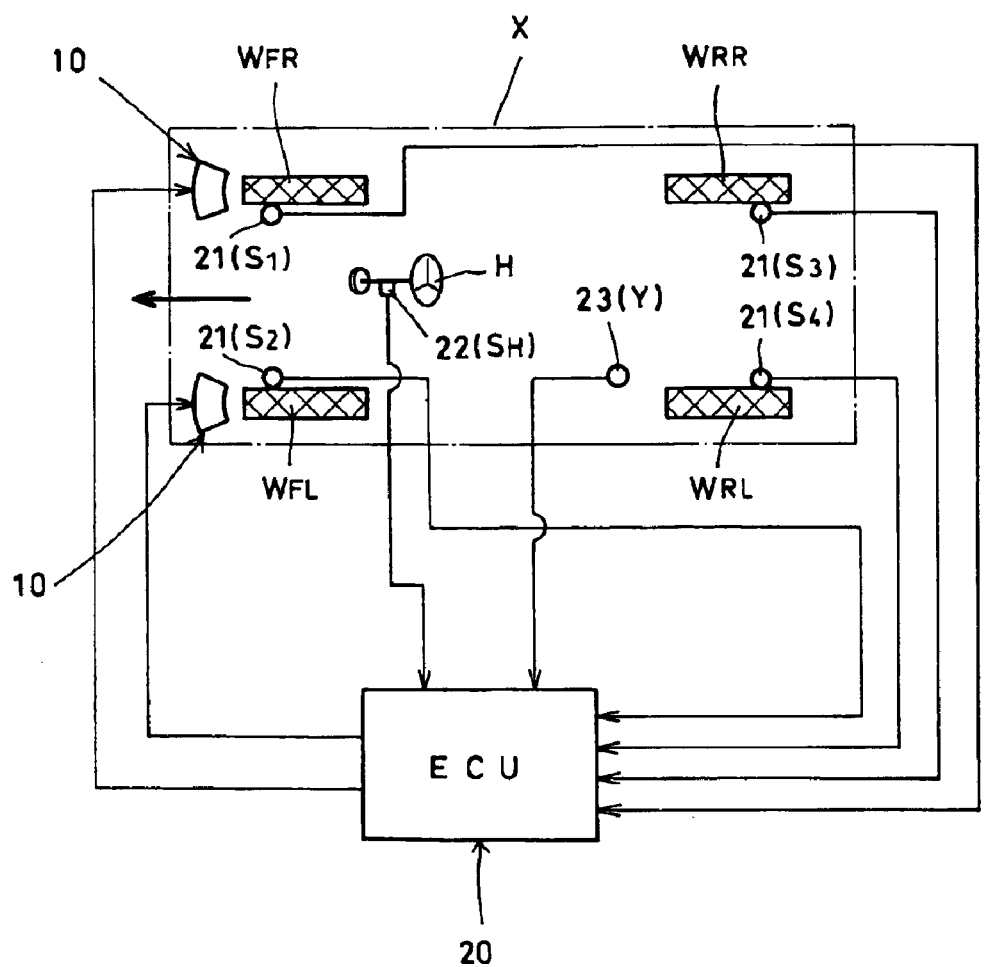
FIG. 1 is a schematic diagram of the lateral movement stabilizing device of a first embodiment.
Figure 2:
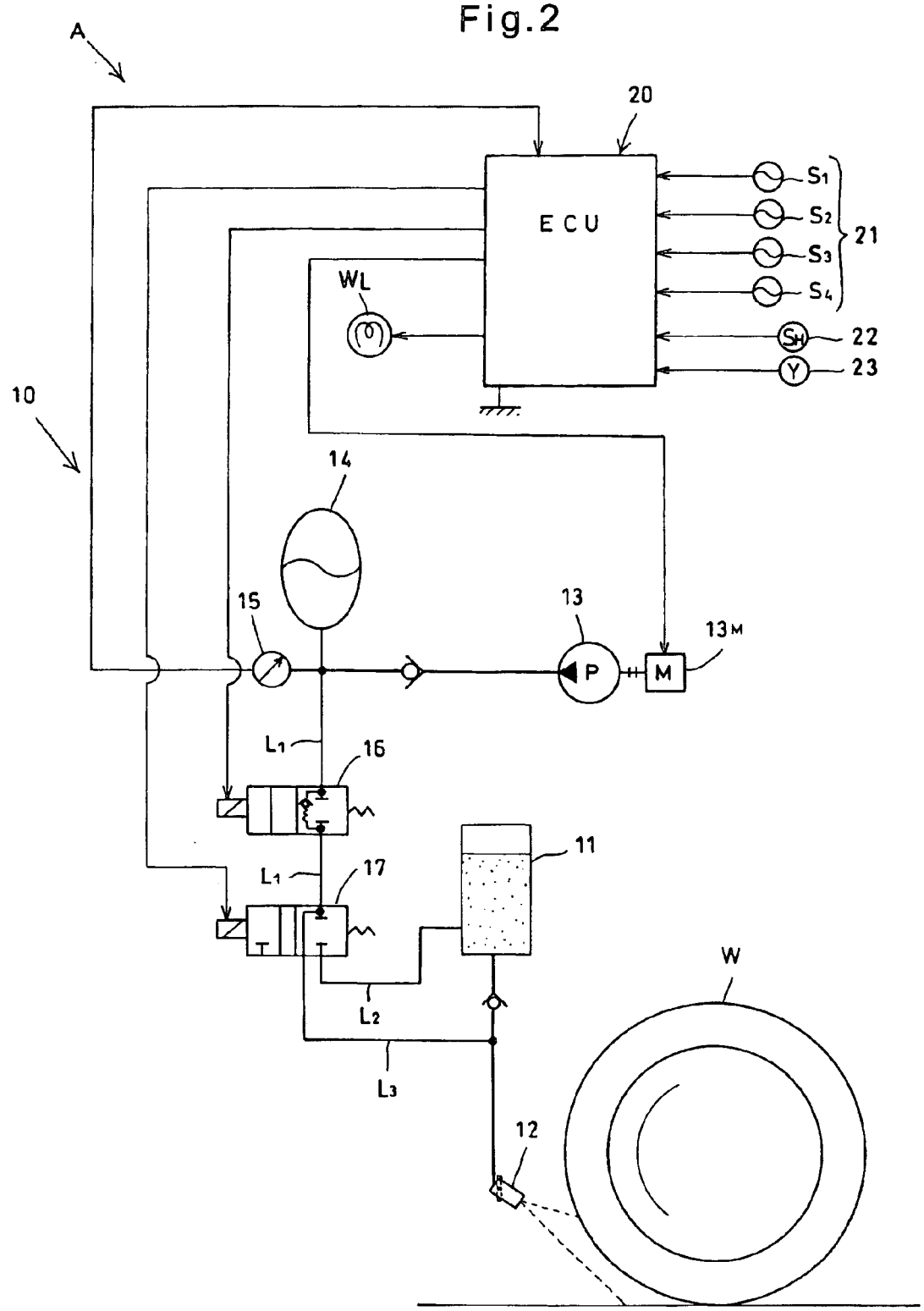
FIG. 2 is a circuit diagram of the frictional force adding means of the same.

The embodiments of this invention will be described with reference to the drawings. FIG. 1 is a schematic diagram of the lateral movement stabilizing device of the first embodiment. FIG. 2 is a circuit diagram of the lateral movement stabilizing device with frictional force adding means for each wheel. As shown, the vehicle X is provided with frictional force adding means 10 for the front two of the wheels ($W_{FR}$, $W_{FL}$, $W_{RR}$, $W_{RL}$). Each adding means 10 has an actuating member driven by an actuator. A controller 20 sends a control signal to the actuator to activate it, thereby driving the actuating members. The frictional force adding means 10 will be described later. To the controller 20, detection signals from wheel speed sensors ($S_1$ to $S_4$) for the turning speeds of four wheels W, a steering angle sensor 22 ($S_H$) for detecting the steering angle of the steering wheel, and a yaw rate sensor 23 (Y) for detecting the turning angular speed (yaw rate) in the acute angle direction of the vehicle are inputted.

As shown in FIG. 2, the frictional force adding means 10 have a particle container 11, and an injection nozzle 12 for blowing slip preventive particles stored therein into between the wheel W and the road surface as actuated members. They also have various actuators for driving an air pump 13 with a motor $13_M$, feeding the compressed air into an accumulator 14, and feeding the compressed air accumulated therein to the particle container 11 and injection nozzle 12 through solenoid valves 16 and 17. By the detection signal from a pressure sensor (or switch), the pressure in the accumulator 14 is adjusted and held at a preset pressure by driving the air pump 13. As the slip preventive particles, sand or ice particles are used.

The solenoid valve 16 is a changeover valve for changing over the supply and stop of compressed air. The solenoid valve 17 is a changeover valve which feeds compressed air selectively to the particle container 11 or the injection nozzle 12. A main line $L_1$ is connected from the air pump 13 and the accumulator 14 to the solenoid valves 16 and 17. Piping from the solenoid valve 17 comprises a supply line $L_2$ for feeding compressed air to the particle container 11, and a bypass line $L_3$ connected from the solenoid valve 17 to an intermediate position of the line for feeding the slip preventive particles from the particle container 11 to the injection nozzle 12. The bypass line $L_3$ directly feeds compressed air to the injection nozzle 12, separately from the supply line $L_2$, to prevent clogging of the injection nozzle 12 or to adjust the inclination direction of the nozzle.

Since the solenoid valves 16, 17 are the two-position type, two are provided. But if they are a three-position type, one will do. Also, the injection nozzle 12 is mounted so that its angle is adjustable to an optimum angle relative to the wheel tire W and the road surface. It is supported by a pivot such that adjustment of its angular position can be automatically adjusted under the pressure of compressed air blown through the bypass line $L_3$.

The controller 20 comprises a micro-computer which includes a fixed memory unit for storing control programs, a temporary memory unit for processing input data, and a computing/processing unit for carrying out computing/processing based on various data and sending control signals. Actual on-board control programs include e.g. an ABS control program. In this embodiment, description will be made about a program for controlling lateral movement of the vehicle. This control program controls the increase amount of friction coefficient between the tires of the front two wheels and the road surface, by braking wheels according to the difference between a target yaw rate (turning angular speed) determined from the steering angle and the vehicle speed when the steering wheel is operated by a predetermined angle, thereby improving the steerability and stability of the vehicle.

With the lateral movement control device of the embodiment having such a structure, control is carried out as follows. As described above, lateral movement control is carried out by use of two sets of frictional force adding means 10 for the front two wheels. For necessary braking, ordinary brake means (first braking force) is applied to the wheels. If the friction coefficient $\mu$ is extremely small e.g. on a frozen road, the frictional force adding means 10 are activated to increase the friction coefficient $\mu$ by scattering slip preventive particles.

In the frictional force adding means 10, when the engine is started, the air pump 13 is activated, so that compressed air is fed to the accumulator 14 and accumulated until the pressure signal from the pressure sensor 15 reaches a predetermined pressure. In a normal state, the solenoid valves 16, 17 are set at positions shown in FIG. 2. That is, the solenoid valve 16 is set at a position where it shuts off compressed air while the solenoid valve 17 is set at a position where it communicates with the bypass line $L_{23}$. When a control signal is sent from the controller 20 to the solenoid valves 16, 17, the solenoid valve 16 is changed over to supply compressed air, while the solenoid valve 17 is turned on to supply compressed air to the particle container 11, thereby sending particulates to the injection nozzle 12 to blow them.

Figure 3:
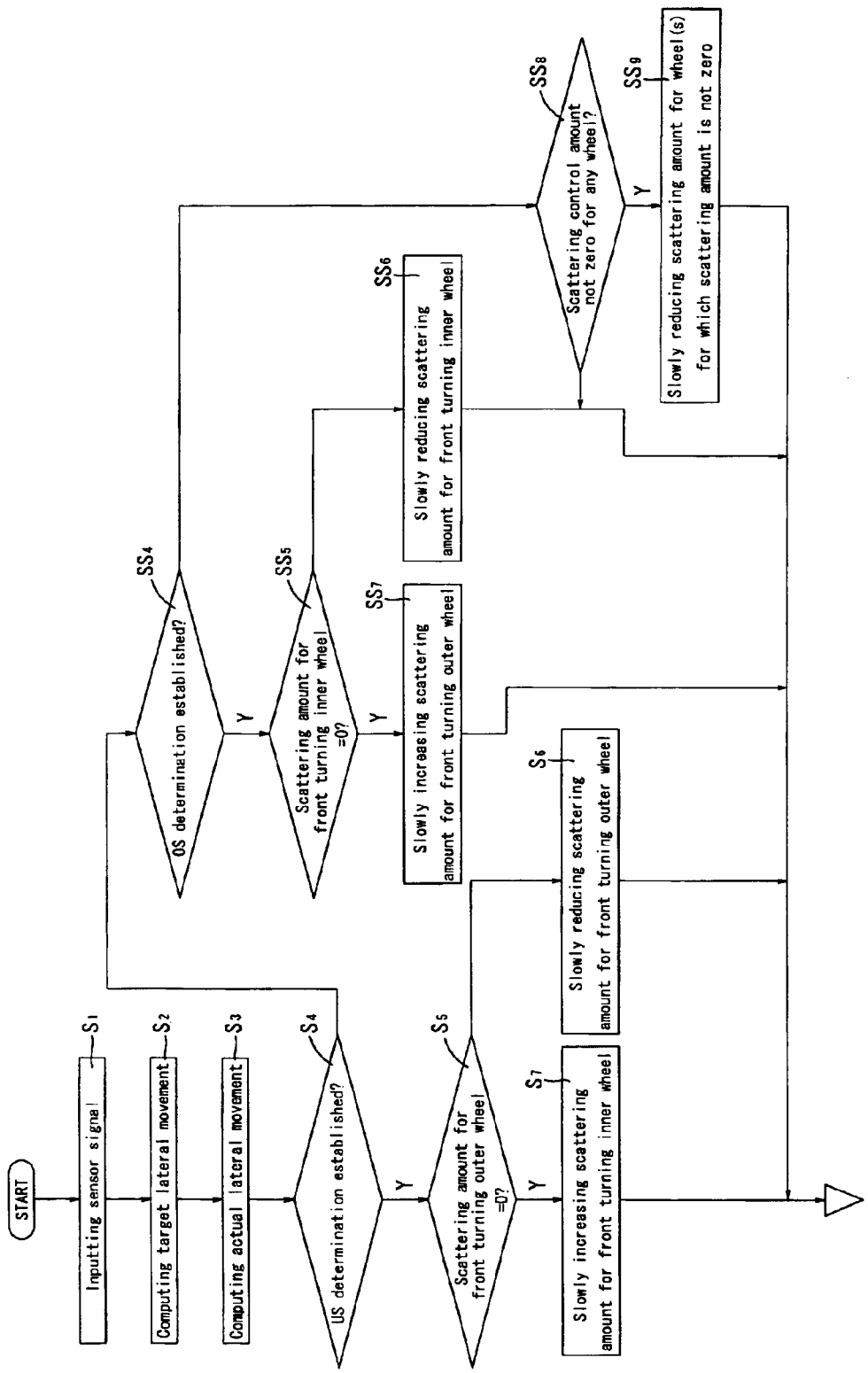
FIG. 3 is a flowchart showing the operation of the same.

By blowing the particulates, the friction coefficient $\mu$ increases, so that the braking effect improves. By turning on the solenoid valve 16 and turning off the solenoid valve 17 before the vehicle speed reaches a predetermined low speed to feed compressed air into the bypass line $L_3$, the injection nozzle 12 is checked for clogging, and simultaneously, the actuators such as the motors $13_M$ is checked for operation. The above is the basic control of the frictional force adding means for the front two wheels. With such basic control applied to the front two wheels, lateral movement control is carried out. Hereinbelow, description will be made with reference to the flowchart of FIG. 3.

Lateral movement control is carried out based on input signals sent from the wheel speed sensors 21 ($S_1$–$S_4$), steering angle sensor ($S_H$), and yaw rate sensor 23 (Y) to the controller 20 in step $S_1$. That is, when the engine is started and the vehicle begins moving, the vehicle speed is computed from the signal form the wheel speed sensors 21 in $S_1$, and the steering angle resulting from the operation of the steering wheel is computed from the signal from the steering angle sensor 22. And in $S_2$, the value of the target lateral movement (turning angular speed) is computed from the steering angle and the vehicle speed. Further, in $S_3$, the value of the actual lateral movement (turning angular speed) is computed from the input signal from the yaw rate sensor 23 (Y).

Next, in $S_4$, based on the difference in value between the target lateral movement and the actual lateral movement, it is determined whether or not it is understeer (insufficient steering, abbreviated to US) is determined. If determined US, it proceeds to step $S_5$ in which the frictional force adding means 10 is activated by a control signal from the controller 20 to scatter the particulates for the front two wheels. And the scattering amount of the particulates to be slowly increased or reduced is determined according to the degree of US for the front turning inner and outer wheels.

That is, if the degree of US is large, in order to determine whether it is US due to the previous control, it is determined whether or not the scattered amount for the front turning outer wheel is zero. But since the scattering amount for the front turning outer wheel is initially zero even in the state of US, in $S_7$, the scattering amount to the turning inner wheel is slowly increased to slightly increase the degree of increase in the friction coefficient $\mu$ for the turning inner wheel. This is repeated. Slow increase and reduction of scattering amount is carried out by setting the particulate scattering time longer or shorter by a predetermined time relative to the normal preset time commanded to the solenoid valves 16, 17 with the scattering amount set to a predetermined amount.

By doing so, it is possible to increase the friction coefficient $\mu$ between the wheel tire of the front turning inner wheel and the road surface, thereby increasing the turning moment in the turning direction. Also, if determination has already been made as an OS state previously, since scattering has been done for the front turning outer wheel, determination in $S_5$ will be negative. Now it proceeds to $S_6$. In $S_6$, the scattering amount for the front turning outer wheel is slowly reduced. This reduces the amount of increase of the friction coefficient $\mu$ between the wheel tire of the front turning outer wheel and the road surface, so that the turning moment in the turning direction increases.

On the other hand, if it is determined not US in $S_4$, it proceeds to step $SS_4$, where it is determined whether it is oversteer (over steering, abbreviated to OS). If OS, it proceeds to $SS_5$, where the frictional force adding means 10 is activated to scatter the particulates. In this case, too, the scattering amounts to be slowly increased or reduced are determined for the front turning inner and outer wheels. That is, in the determination in Step $SS_5$, since the scattering amount for the turning inner wheel is initially zero, in $SS_7$, the scattering amount for the turning outer wheel is slowly increased to increase the degree of increase in the friction coefficient $\mu$ for the turning outer wheel. This is repeated.

By increasing the friction coefficient $\mu$ between the wheel tire of the turning outer wheel and the road surface, the turning moment in the steered turning direction is reduced by offsetting. Also, if determined US previously, since scattering has already been made for the front turning inner wheel, determination in $SS_5$ will be negative. Thus it proceeds to $SS_6$ where the scattering amount for the front turning inner wheel is slowly reduced. This reduces the amount of increase of the friction coefficient $\mu$ between the wheel tire of the front turning inner wheel and the road surface, thus reducing the turning moment in the turning direction by offsetting.

If it is determined in $SS_4$ that it is not in an OS state, it is neither in a US state nor in an OS state, but the steering state is in a proper state. In this case, it is determined in step $SS_8$ whether or not scattering is being made for either of the front wheels. If no scattering is being made, the determination will be negative. Thus the control ends and it returns to the beginning to repeat the above determinations.

On the other hand, if determined US or OS previously, since scattering has been made for one of the wheels, it proceeds to $SS_9$. In $SS_9$, the currently scattering amount is slowly reduced and it returns to the beginning to repeat the determination control. Thus, if the vehicle becomes US or OS again, the scattering amount is adjusted by the above determinations. But if the vehicle turns to straight travel from turning travel, or the road surface condition changes, so that the friction coefficient $\mu$ has increased, no scattering becomes necessary. In such a case, even if the scattering amount is slowly reduced in $SS_9$, no US or OS determination will be met. Thus, in $SS_9$, the amount is slowly reduced until the scattering amount becomes zero, thereby preventing unnecessary scattering.

By controlling the frictional force adding means 10 as described above, even on a road surface where the friction coefficient $\mu$ is extremely small such as a frozen road, turnability improves by producing frictional force required for steering by increasing or reducing the value of the friction coefficient $\mu$, so that the vehicle travelling stability and safety improve.

In the above embodiment, the frictional force adding means 10 is of a particulate scattering type. But instead, they may be means using a friction plate 12' shown in FIG. 4B.

Figure 4A:
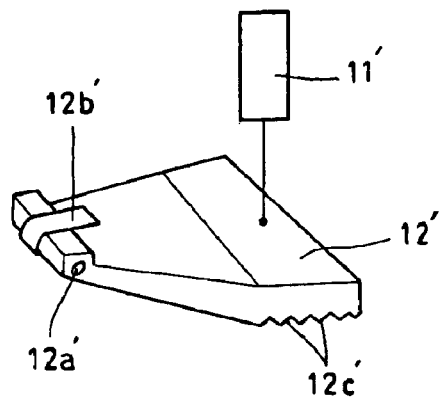
FIG. 4A is a perspective view of the friction plate.

The friction plate 12' shown in FIG. 4A is an example of the type which is installed on a suitable position of the vehicle frame, and normally is held above the road surface. When necessary, the friction plate 12' is lowered to engage its frictional surface 12c' on the road surface to obtain frictional force for the vehicle. The friction plate 12' is pivotally supported on a pivot shaft 12a'. A leaf spring 12b' always imparts elastic force in the rising direction to the friction plate 12'. A hydraulic cylinder 11' is connected to the friction plate 12' to lower the friction plate 12' when necessary.

Figure 4B:
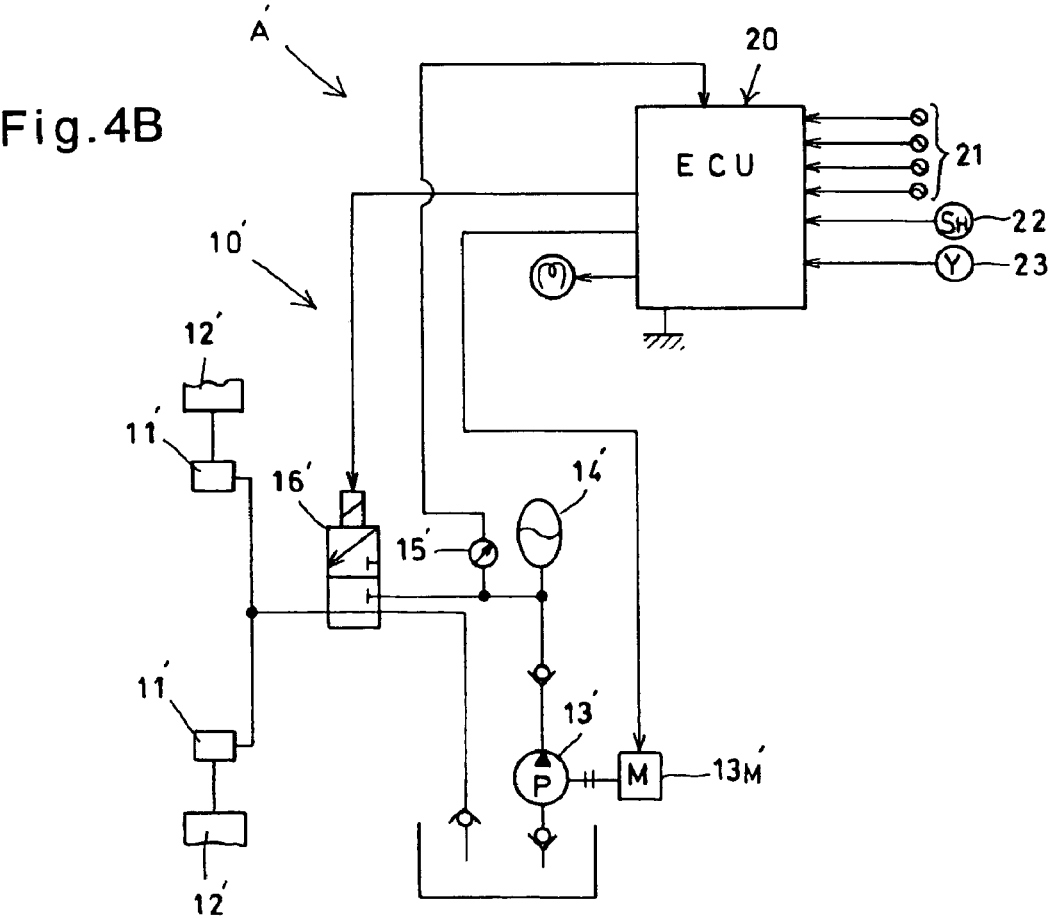
FIG. 4B is a circuit diagram of another example of the frictional force adding means of the same.

FIG. 4B shows a schematic structure of a brake assisting device for auxiliary braking. It has two friction plates 12' operated by a hydraulic circuit. It includes a hydraulic pump 13', a driving motor $13_M'$, an accumulator 14', a pressure sensor (switch) 15', and a solenoid valve 16'. Since no bypass line is provided in the hydraulic circuit, the solenoid valve 16' is commonly used for the two friction plates 12'. Another solenoid valve is unnecessary.

A control signal is sent from the controller 20 to the solenoid valve 16' and the motor $13_M'$ to drive these actuators. A detection signal of a pressure sensor 15' for detecting the hydraulic pressure is also sent to the controller 20. Connection is such that signals of the wheel speed sensors 21 ($S_1$–$S_4$), steering angle sensor 22 ($S_H$), and yaw rate sensor 23 (Y) are also simultaneously sent to the controller 20.

Figure 5:
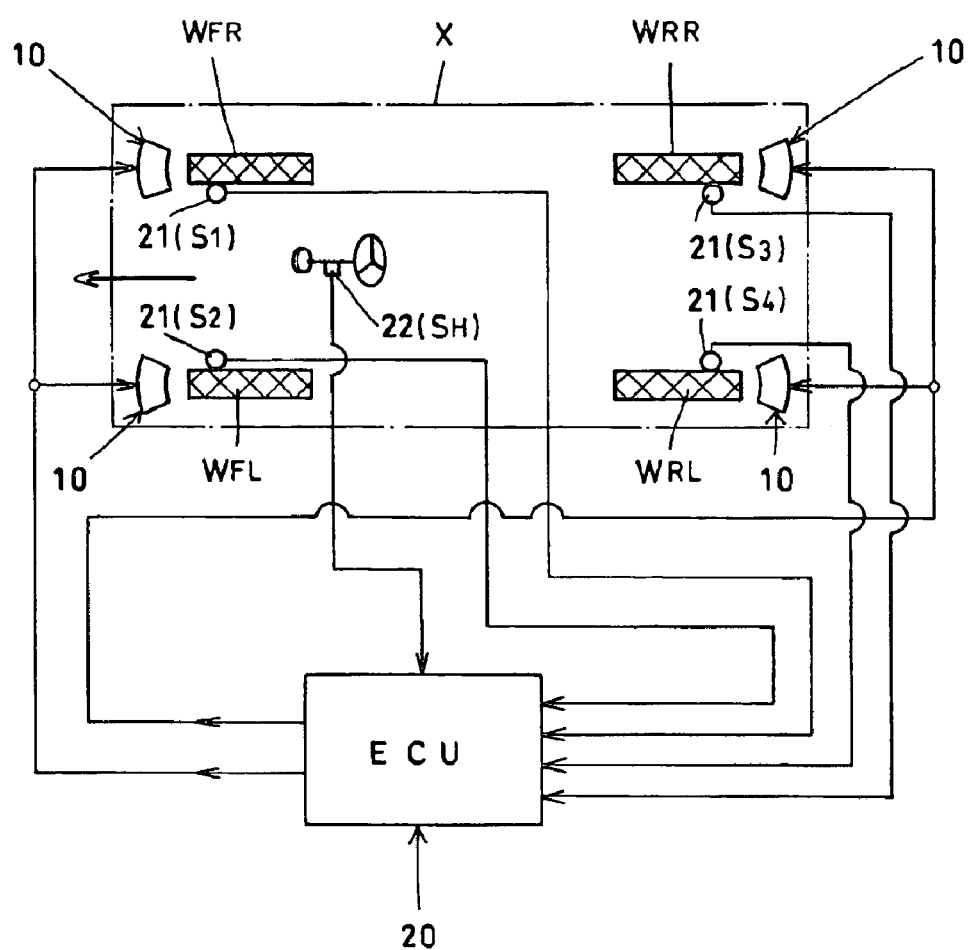
FIG. 5 is a schematic diagram of the lateral movement stabilizing device of a second embodiment.

FIG. 5 shows a schematic diagram of the vehicle lateral movement control device of the second embodiment. The control device of this embodiment has frictional force adding means 10 for all of the front two and rear two wheels. Also, input signals from the wheel speed sensors 21 ($S_1$–$S_4$) and steering angle sensor 22 ($S_H$) are sent to the controller 20. But no a yaw rate sensor is provided. Since the frictional force adding means 10, sensors 21 and 22 are the same as in the first embodiment, detailed description is omitted. For the controller 20, a microcomputer is used. But the control program is different from the one of the first embodiment.

Figure 6:
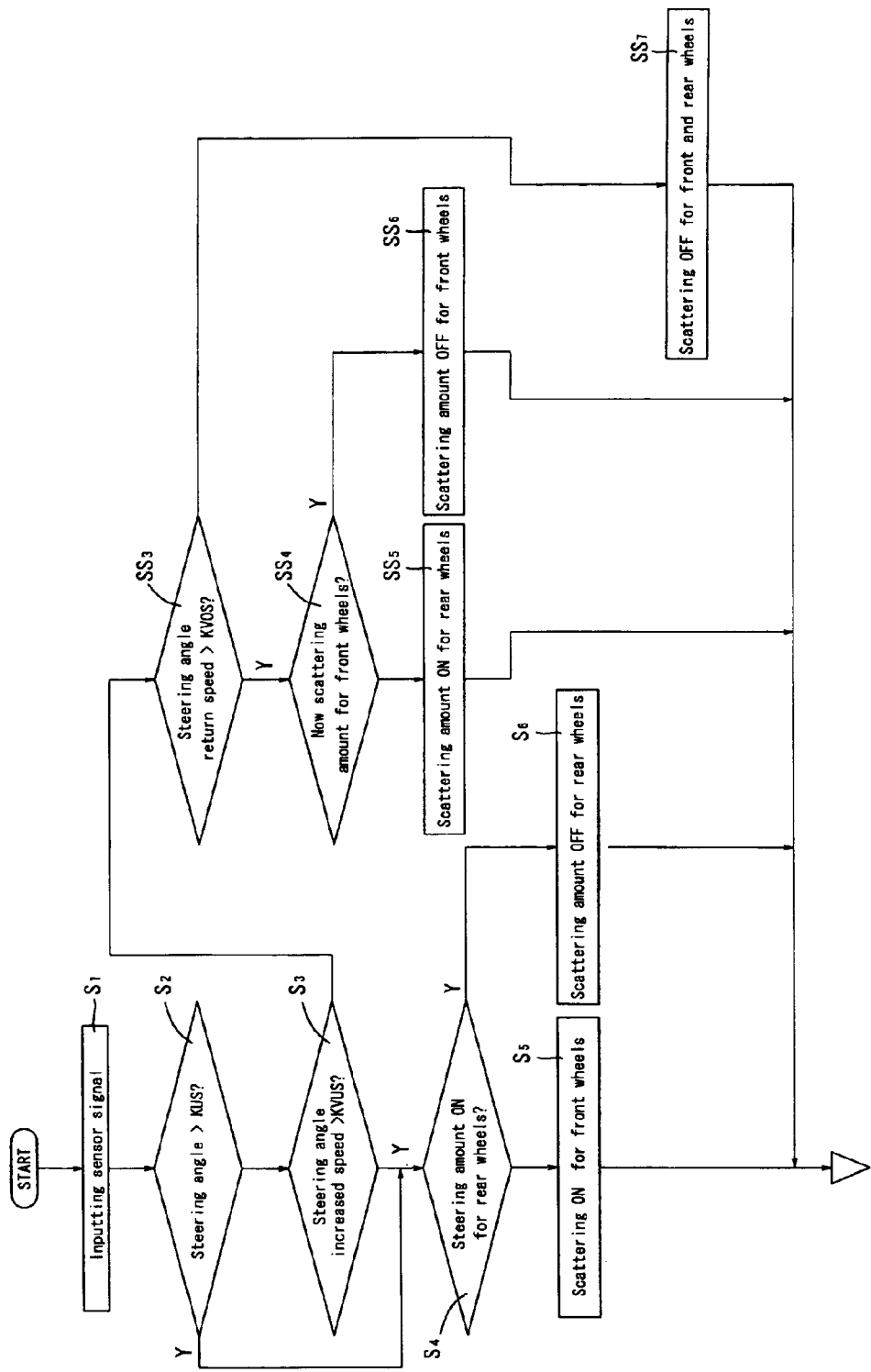
FIG. 6 is a flowchart showing the operation of the same.

The lateral movement control of this embodiment will be described with reference to the flowchart of FIG. 6. In this lateral movement control, depending on whether or not the steering angle or steering speed is higher than a predetermined value, scattering of the particulates by the frictional force adding means 10 for the front two wheels or the rear two wheels is turned on or off. Otherwise, as a function corresponding thereto, the frictional force by the friction plate 12' of FIG. 4 is turned on or off. In the second embodiment, too, as the frictional force adding means, it is possible to use type of the friction plate 12' of FIG. 4A. But the description will be mainly made using the frictional force adding means 10 of a type in which particulates are scattered.

When the engine is started and the vehicle begins traveling, in step S1, input signals from the wheel speed sensors 21 and steering angle sensor 22 are sent to the controller 20, and the wheel speeds, steering angle and steering angular speed are computed and detected. In $S_2$, determination is made as to whether the steering angle φ has exceeded a predetermined value KUS. If exceeded, it proceeds to $S_4$. If not exceeded, in $S_3$, determination is made as to whether the steering angle increase speed dφ/dt has exceeded a predetermined value KVUS. If the steering angle increase speed dφ/dt has exceeded KVUS, in $S_4$, determination is made as to whether the particulates are being scattered for the rear two wheels, and in $S_5$, scattering is turned on for the front two wheels, and in $S_6$, scattering for the rear two wheels is turned off.

If the above values of φ or dφ/dt has exceeded the preset value KUS or KVUS, this means that the driver wants to turns the vehicle more, and the vehicle is in a US state. Thus control is made such that the turning moment increases with the front wheels by increasing the friction coefficient μ by scattering the particulates for the front two wheels.

In step $S_3$, if the steering angle increase speed dφ/dt is equal to or less than the preset value KVUS and the steering angle φ is also equal to or less than the preset value KUS, the steering angle return speed is determined when the wheel is returned next time. In $SS_3$, determination is made as to whether or not the steering angle return speed dφ/dt has exceeded the preset value KVOS. If exceeded, since the driver is judging that the vehicle is turning too much, the vehicle is in an OS state. Thus it is necessary to cancel the produced yaw, so that in $SS_4$, determination is made as to whether or not scattering is being made for the front wheels. If this determination is NO, that is, if scattering for the front wheels is currently not being made, in $SS_5$, scattering for the rear wheels is turned on. If YES, that is, if scattering is currently being made for the front wheels, in $SS_6$, scattering for the front wheels is turned off. By doing so, the OS state is returned to proper by increasing the frictional force of the rear wheels by not carrying out increase of the friction coefficient for the front wheels and increasing the friction coefficient for the rear wheels.

In the determination in $SS_3$, if determination is NO, since the steering angle return speed is also in a proper range, scattering of the particulates for increasing the friction coefficient is not necessary. Thus scattering for the front and rear wheels is turned off, and the process returns to the head to repeat this control.

Figure 7:
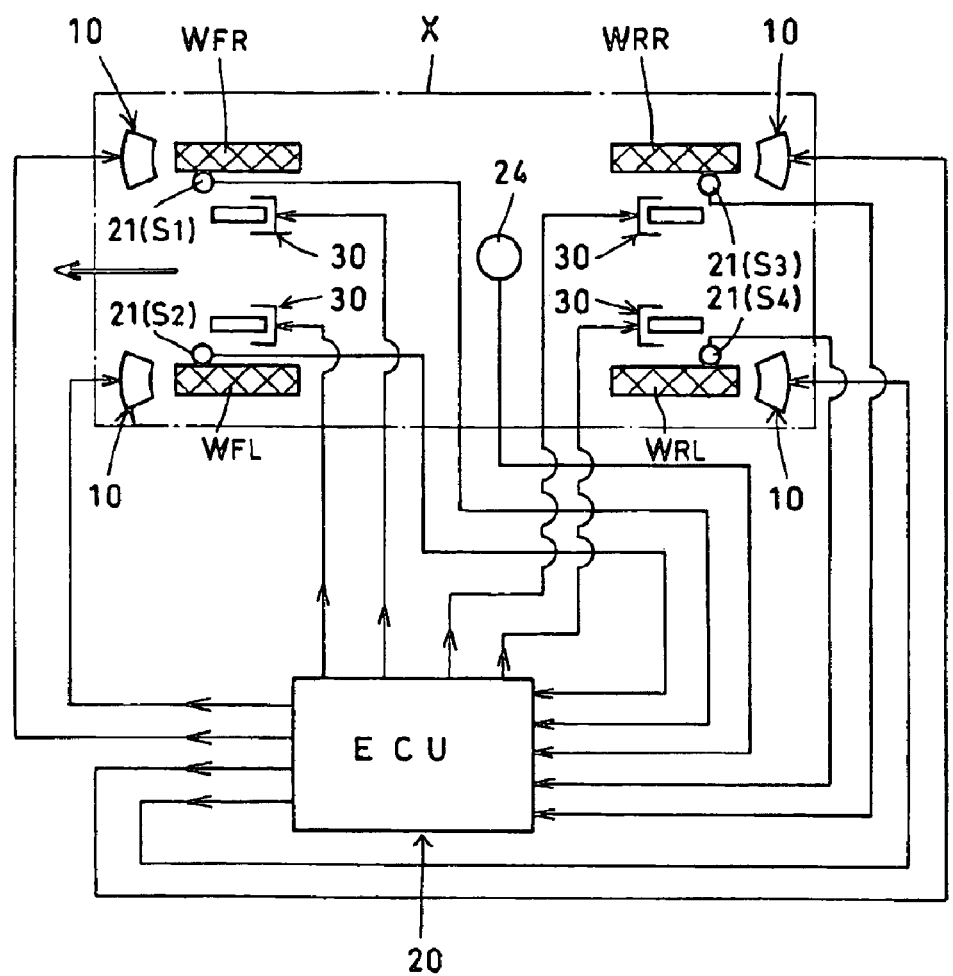
FIG. 7 is a schematic diagram of the lateral movement stabilizing device of a third embodiment.

FIG. 7 shows a schematic diagram of the vehicle lateral movement control device of the third embodiment. In this embodiment, lateral movement control is carried out in cooperation with an ABS (antilock brake system) control. In this embodiment too, the frictional force adding means 10 or 10' of FIG. 2 or 4 are applied. But detailed description is omitted. Also, in this embodiment, signals from wheel speed sensors 21 ($S_1$–$S_4$) and a brake pedal switch (STPSW) 24 are sent to the controller 20, which besides the lateral movement control program, includes an ABS control program. Thus, control signals are sent independently from the controller 20 to the respective brakes 30 mounted on all the wheels of the front and rear wheels. But while brake operation is actually turned on and off through solenoid valves provided in the hydraulic circuit for braking, the circuit is shown as if the control signals are directly sent to the brakes. Also, while the ABS control system is known, brief description will be made about ABS control.

Generally, in the ABS control, the wheel speeds are computed in the controller 20 based on input signals from the wheel speed sensors 21 ($S_1$–$S_4$) and unsteerableness resulting from locking of the wheels due to low frictional coefficient e.g. on wet load surface is effectively prevented when the brake pedal is stepped for braking. In this case, control is made to carry out effective braking by recovering the friction coefficient as much as possible by repeating the measure of estimating the vehicle speed from the signals of the wheel speed sensors with reference to the value of deceleration of an acceleration sensor (not shown), opening solenoid valves so that the wheel(s) is released from locking only for a short time based on the estimated vehicle speed, and increasing the braking pressure to again brake the wheels.

In such an ABS control, if the right and left wheels travel on a "straddle road" on which the road surface has different friction coefficients μ, a difference will be created between the right and left braking forces, so that the vehicle will deflect. Thus, in the ABS control, control (yaw control) in which turning of the vehicle is prevented by suppressing the braking force on the high-μ side in the initial period of braking is particularly included. But in such ABS control, in order to ensure stability, deceleration during braking is slightly sacrificed. In this embodiment, control is carried out such that lowering of deceleration is prevented by use of the frictional force adding means 10 or 10'.

Figure 8:
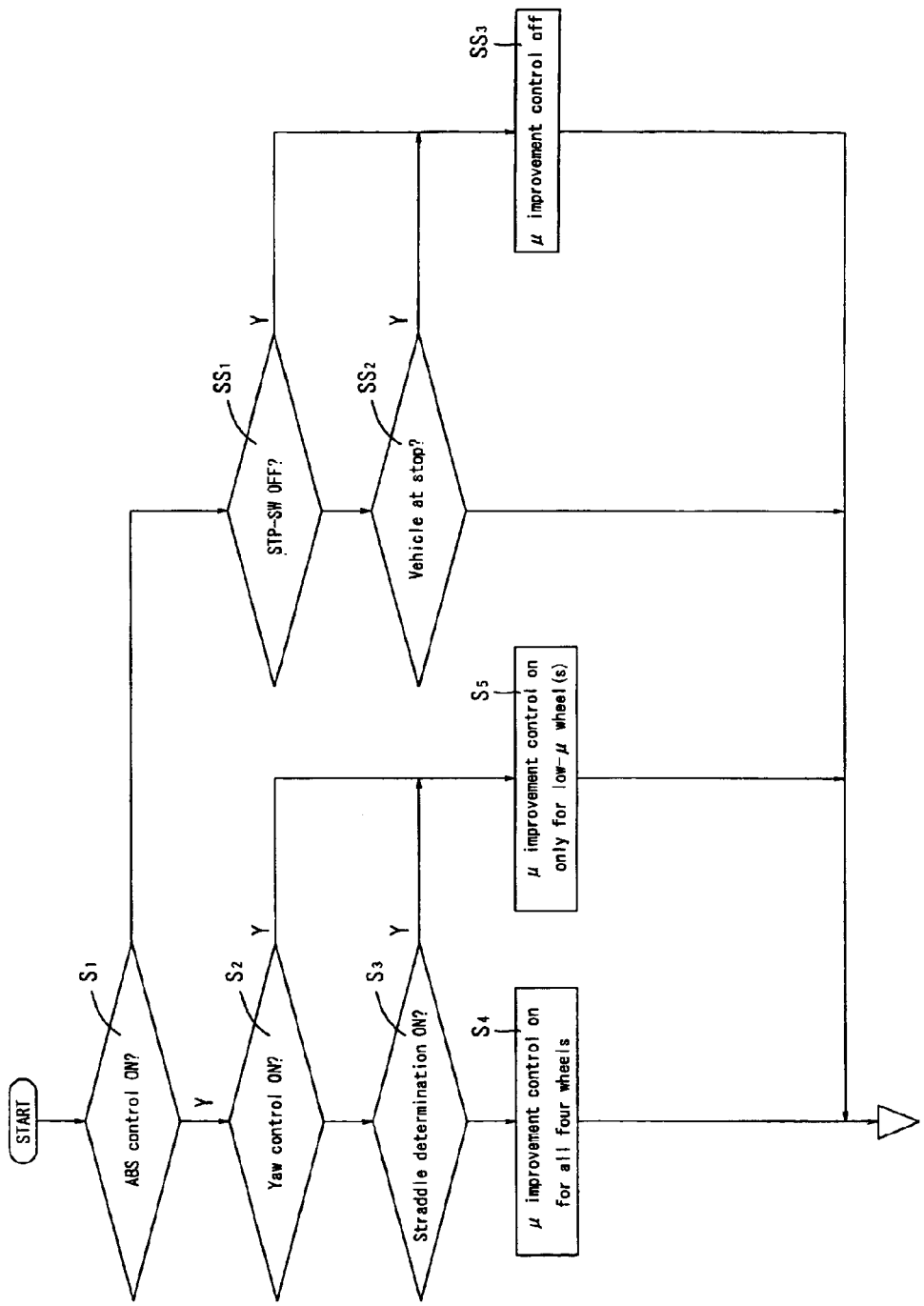
FIG. 8 is a flowchart showing the operation of the same.

This control is carried out following the steps shown by the flowchart of FIG. 8. In step $S_1$, first, determination is made whether or not it is in ABS control. If in ABS control, in $S_2$, determination is made as to whether or not it is now in yaw control. If not in yaw control, in $S_3$, determination is made as to whether or not determination of straddle road is being made. If neither in yaw control nor determination of straddle road is being made, this means that all the four wheels are being braked on an identical friction coefficient road in the ABS control. Thus, control signals are sent from the controller 20 to the respective frictional force adding means 10 of the four wheels to scatter particulates such that the friction coefficient μ improves for all the four wheels.

If the determination in $S_2$ and $S_3$ is positive, in step $S_5$, particulates are scattered by sending control signals to the frictional force adding means 10 for the low friction coefficient side in the "straddle road". This makes it possible to reduce the difference in friction coefficient between the right and left wheels. Thus it is possible to achieve improvement both in the deceleration and stability.

In the determination in $S_1$, if not in the ABS control, after carrying out step $SS_1$ and thereafter, it returns to the start and repeat this control. If in $SS_1$, the brake pedal switch 24 is determined off, or in $SS_2$, it is determined that the travel of the vehicle has been stopped, the control for improving the friction coefficient μ is stopped in $SS_3$. Thus, even if ABS control is made on a "straddle road", cooperative control with ABS control is achieved in which sacrifice of deceleration due to suppression of the braking force is avoided and stability and safety are ensured.

Figure 9:
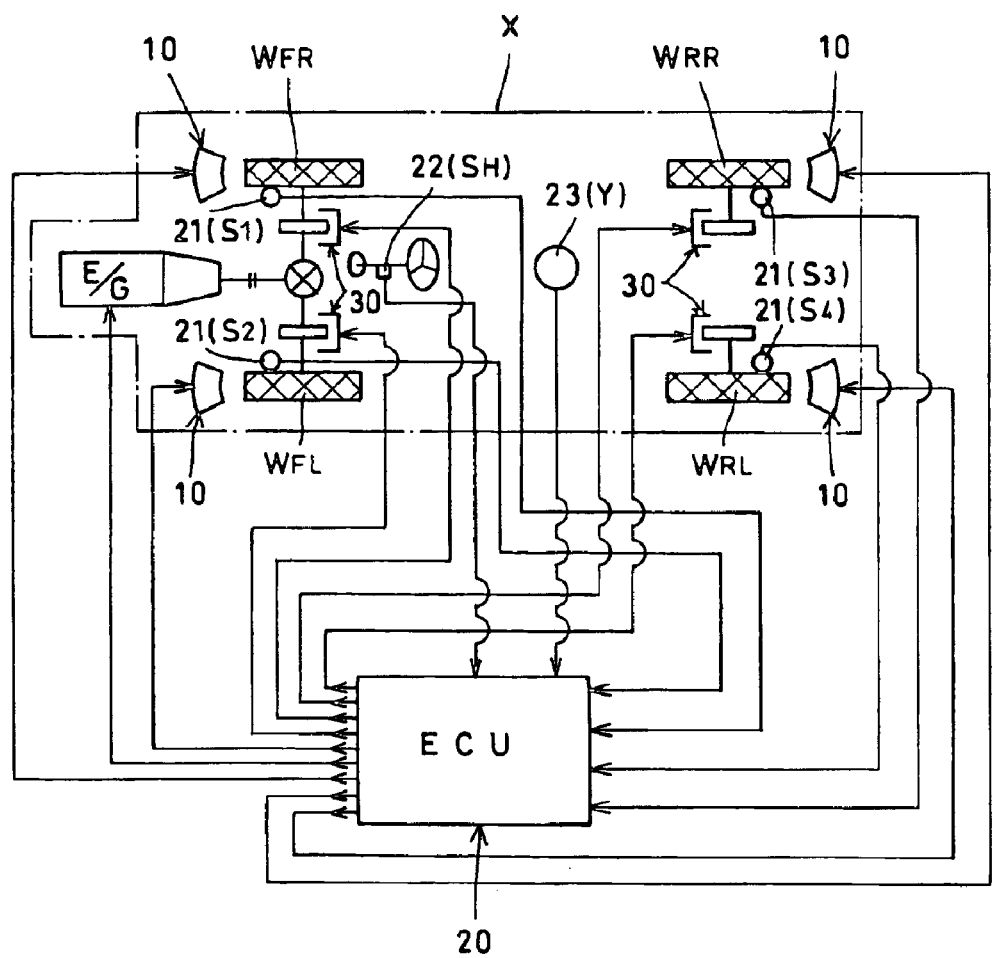
FIG. 9 is a schematic diagram of the lateral movement stabilizing device of a fourth embodiment.

FIG. 9 is a schematic diagram of the vehicle lateral movement control device of the fourth embodiment. The device of this embodiment is an example in which vehicle stability control (VSC) and lateral movement control are cooperatively controlled. As shown, frictional force adding means 10 (or 10') are installed for all the four wheels, and connection is made such that input signals from wheel speed sensors 21 ($S_1$–$S_4$), a steering angle sensor 22 ($S_H$) and a yaw rate sensor 23 (Y) are sent to the controller 20. Control is made by independently sending control signals from the controller 20 to the frictional force adding means 10 and disc brakes 30 of all the four wheels.

While VSC control, too, is widely known like ABS control, it will be briefly described below. When turning the vehicle by the wheel operation while the vehicle is traveling, oversteer (OS) or understeer (US) will develop according to the road surface condition, vehicle speed, emergency avoiding, etc. The travelling state is determined by detecting the signals of the steering angle $\phi$ from the steering angle sensor 22, the vehicle speed from the wheel speed sensors 21 and the yaw rate (turning angular speed) from the yaw rate sensor 23 and computing in the controller 20.

The OS tendency is determined from values of the vehicle slip angle and the slip angular speed, and the US tendency is determined from the deviation between the target yaw rate and the actually measured yaw rate. In an ordinary VSC control, if the OS tendency is large, the OS tendency is suppressed by canceling the vehicle turning moment with the moment in the reverse direction thereto by applying the brake to the front turning outer wheel according to the degree of OS. Also, if the US tendency is large, the US tendency is suppressed by controlling the engine output according to the degree of US and applying the brake to the rear turning inner wheel.

In such VSC control, it is a prerequisite that necessary frictional force of the wheel tires is obtained relative to the road surface during braking. If the friction coefficient $\mu$ of the road surface is extremely small e.g. on a frozen road, even if brake pressure is increased, no required braking force is obtainable. Thus VSC control is insufficient. In the lateral movement control device of this embodiment, in such a case, the frictional force adding means 10 is activated to recover the friction coefficient $\mu$ for good VSC control.

Figure 10:
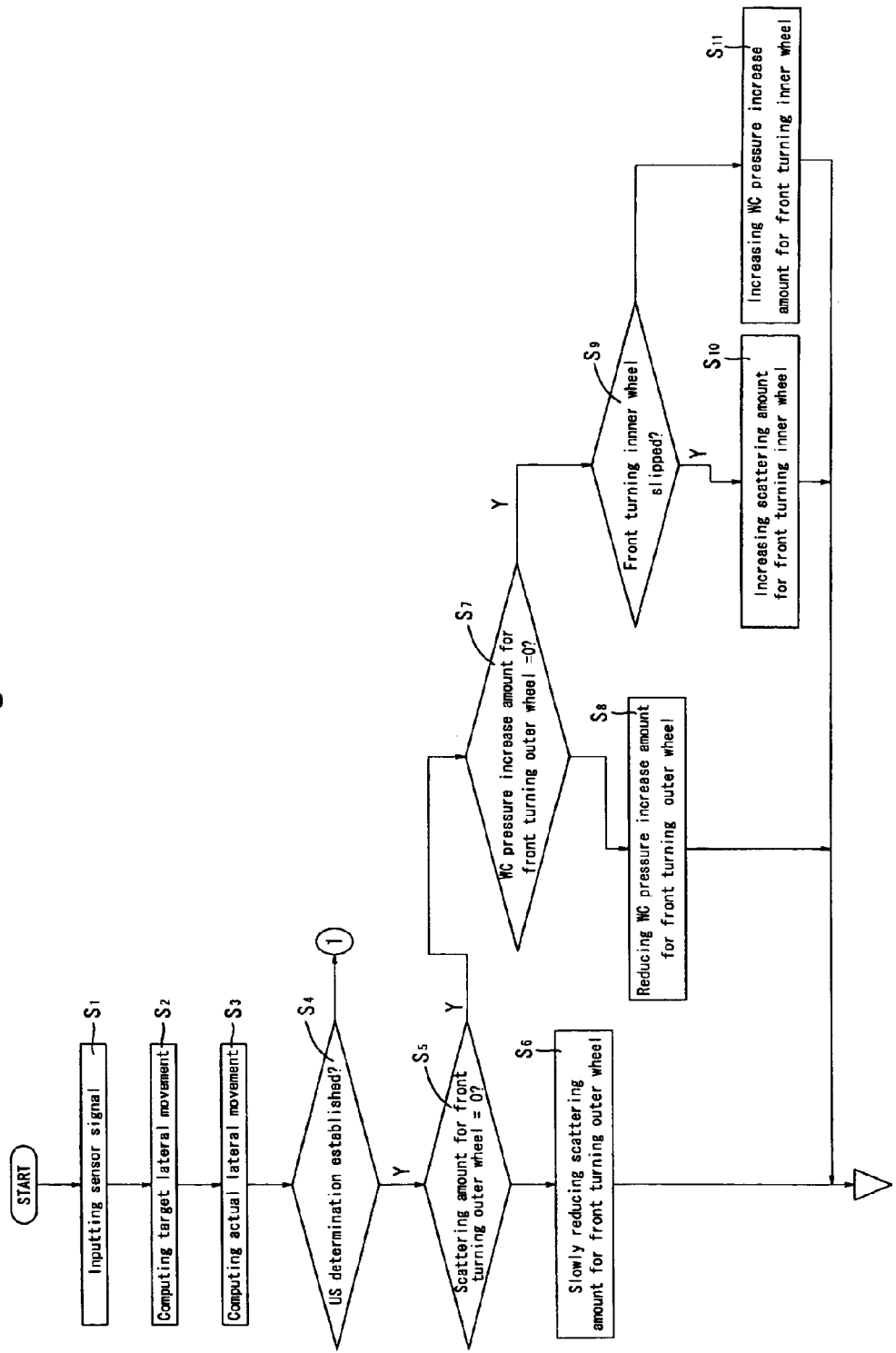
FIG. 10 is a flowchart showing the operation of the same.

For cooperative control with such VSC control, description will be made with reference to the flowcharts of FIGS. 10 and 11. In step $S_1$, input signals from the various sensors 21, 22 and 23 are sent to the controller 20. In $S_2$ from these detection signals, the target lateral movement value (target yaw rate value) is computed, and further in $S_3$, the actual lateral movement value is calculated from the detection signal from the yaw rate sensor 23.

Depending on the deviation between the target lateral movement value and the actual lateral movement value, in steps $S_4$ and thereafter, determination of US or OS is made. Control is carried out as follows. If, in $S_4$, the actual lateral movement value is determined smaller than the target lateral movement value, the vehicle will not turn as intended by the driver. Thus it has a US tendency. In this case, in $S_5$, it is determined whether or not the particulates is being scattered for the front turning outer wheel, and in $S_6$, a command to slowly reduce the scattering amount is given. By repeating this step, it is reduced.

When the scattering amount becomes zero, it proceeds to $S_7$, where determination is made about the pressure increase amount for the hydraulic pressure of the braking of the front turning outer wheel (first braking). In $S_8$, a command to reduce the pressure increase amount. By repeating this, the pressure increase amount is reduced. When the pressure increase amount of hydraulic pressure becomes zero, in $S_9$, determination is made whether or not slip of the front turning inner wheel develops. In this case, determination is made as to whether or not the value of deviation from the detection signals from the wheel speed sensors of the wheels other than the front turning inner wheel exceeds a predetermined range.

If in the determination of $S_9$, it is determined that slip is occurring, the scattering amount of the particulates for the front turning inner wheel is increased. If the slip state is recovered due to increase of the scattering amount, a control signal is given to the corresponding disc brake 30 to increase the pressure increase amount of hydraulic pressure to the brake for the front turning inner wheel. Thus, by effectively applying braking force with the friction coefficient to the turning inner wheel against the road surface recovered, VSC control in a US state is effectively carried out.

Figure 11:
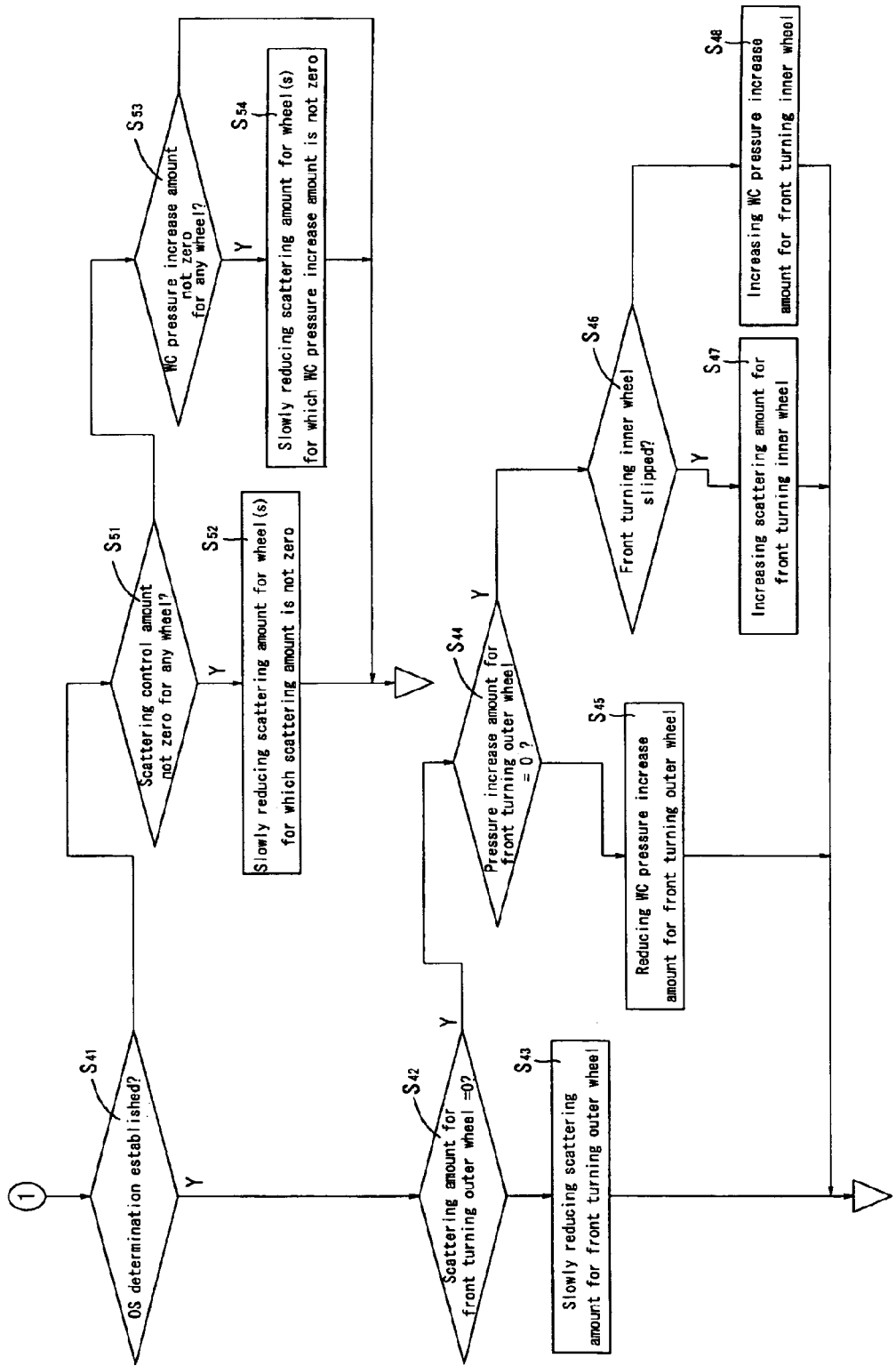
FIG. 11 is another flowchart showing the operation of the same.

Next, in the determination in $S_4$, if the US tendency is not determined, it proceeds to the flowchart of FIG. 11, and in $S_{41}$, OS determination is now made. If the OS tendency is determined, as in the US determination, in $S_{42}$, the scattering amount for the front turning outer wheel is determined, and in $S_{43}$, the scattering amount is slowly reduced. This is repeated to make the scattering amount to zero. In $S_{44}$, the pressure increase amount of brake hydraulic pressure to the front turning outer wheel is determined, and in $S_{45}$, the pressure increase amount is reduced. This is repeated, and when the pressure increase amount becomes zero, it proceeds to $S_{46}$, where the slip state of the front turning inner wheel is determined.

The slip determination in this case is carried out in the same manner as in the determination in $S_9$ for the US determination. In the determination of $S_{46}$, if it is determined that slip is developing, slip will reduce by sending a control signal to the frictional force adding means 10 to increase the scattering amount for the front turning inner wheel in $S_{47}$. When slip decreases, in $S_{48}$, a control signal is sent to increase the pressure increase amount of brake hydraulic pressure to the front turning inner wheel. Thus, VSC control in the OS state is effectively carried out.

If the determination in step $S_{41}$ is NO, this means that it is neither US nor OS. In this case, determination is made in $S_{51}$ as to whether or not there is a wheel for which scattering control is being made. If YES, it proceeds to $S_{52}$ to slowly reduce the scattering amount and slowly finish the scattering control. In $S_{51}$, if the scattering control amount is determined zero, and if no scattering control is being carried out, it proceeds to $S_{53}$. In $S_{53}$, determination is made as to whether or not WC pressure control by VSC is being made. If YES, the WC pressure increase amount is not equal to zero, and it proceeds to $S_{54}$ to slowly reduce the WC pressure increase amount and slowly finish the WC pressure increase control. Thus, even when the scattering amount is slowly reduced, and further, the WC pressure increase control is slowly reduced, if neither the US determination nor OS determination is established, both the lateral movement control and the VSC control end.

Figure 12:
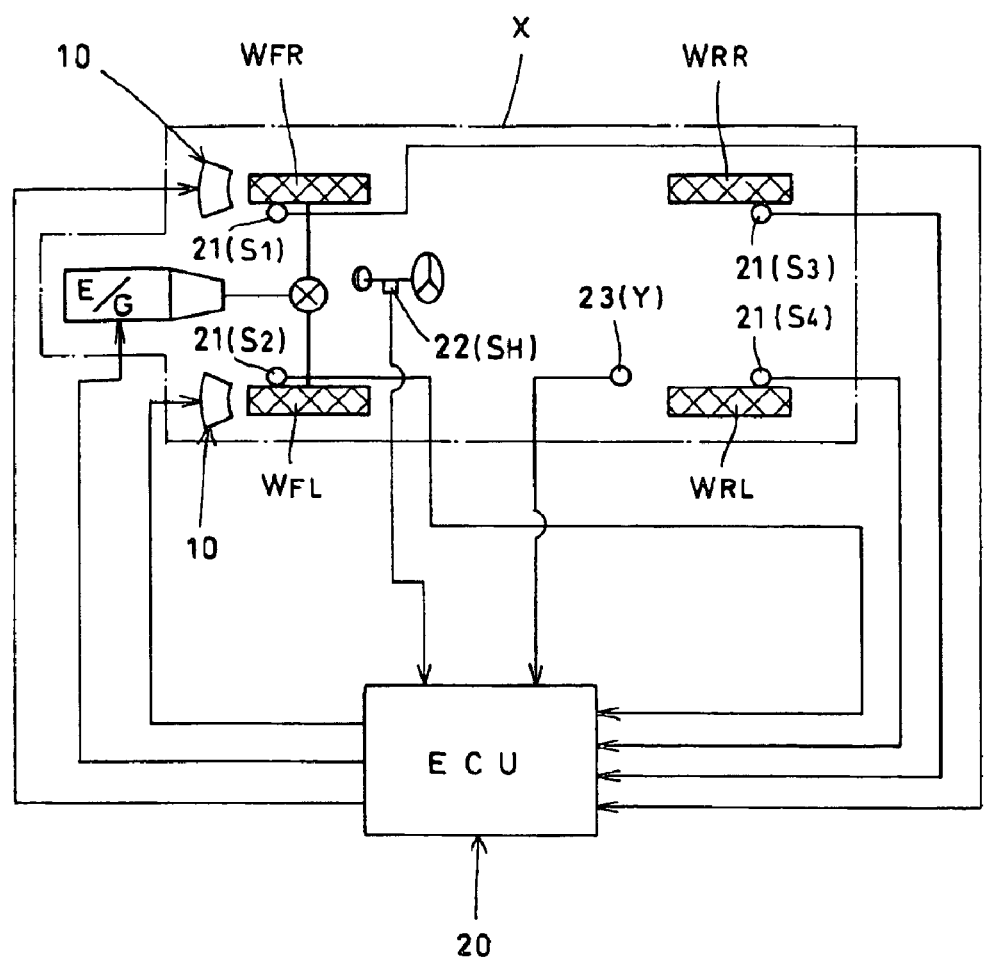
FIG. 12 is a schematic diagram of the lateral movement stabilizing device of a fifth embodiment.

FIG. 12 is a schematic diagram of the vehicle lateral movement control device of the fifth embodiment. The control device of this embodiment is an example in which TRC control (traction control) and lateral movement are cooperatively controlled. Frictional force adding means 10 are provided for the front two wheels, and control signals are independently sent from the controller 20. To the controller 20, input signals from wheel speed sensors 21 ($S_1$–$S_4$), a steering angle sensor ($S_H$) 22, and a yaw rate sensor 23 (Y) are sent, and the vehicle speed, steering angle $\phi$ and yaw rate (turning angular speed) are calculated by computing.

While TRC control, too, is widely known, in this embodiment, the TRC control as described below is carried out. The basic concept of TRC control is such that in the case of an FF car, when it is started and accelerated by stepping in the accelerator pedal, if the road surface is in a slippery state, a front wheel slips, and if the wheel speed of the front wheel markedly exceeds the vehicle speed, which is estimated from the rear wheel speed, it determines that slip has occurred and controls the degree of opening of the throttle valve according to the degree of slip, thereby controlling the engine output by fuel cut or ignition delayed angle. Besides such basic control, TRC includes a program for determining the US or OS state and controlling the engine output by if started in a steered state and side slide tends to develop in the vehicle.

Figure 13:
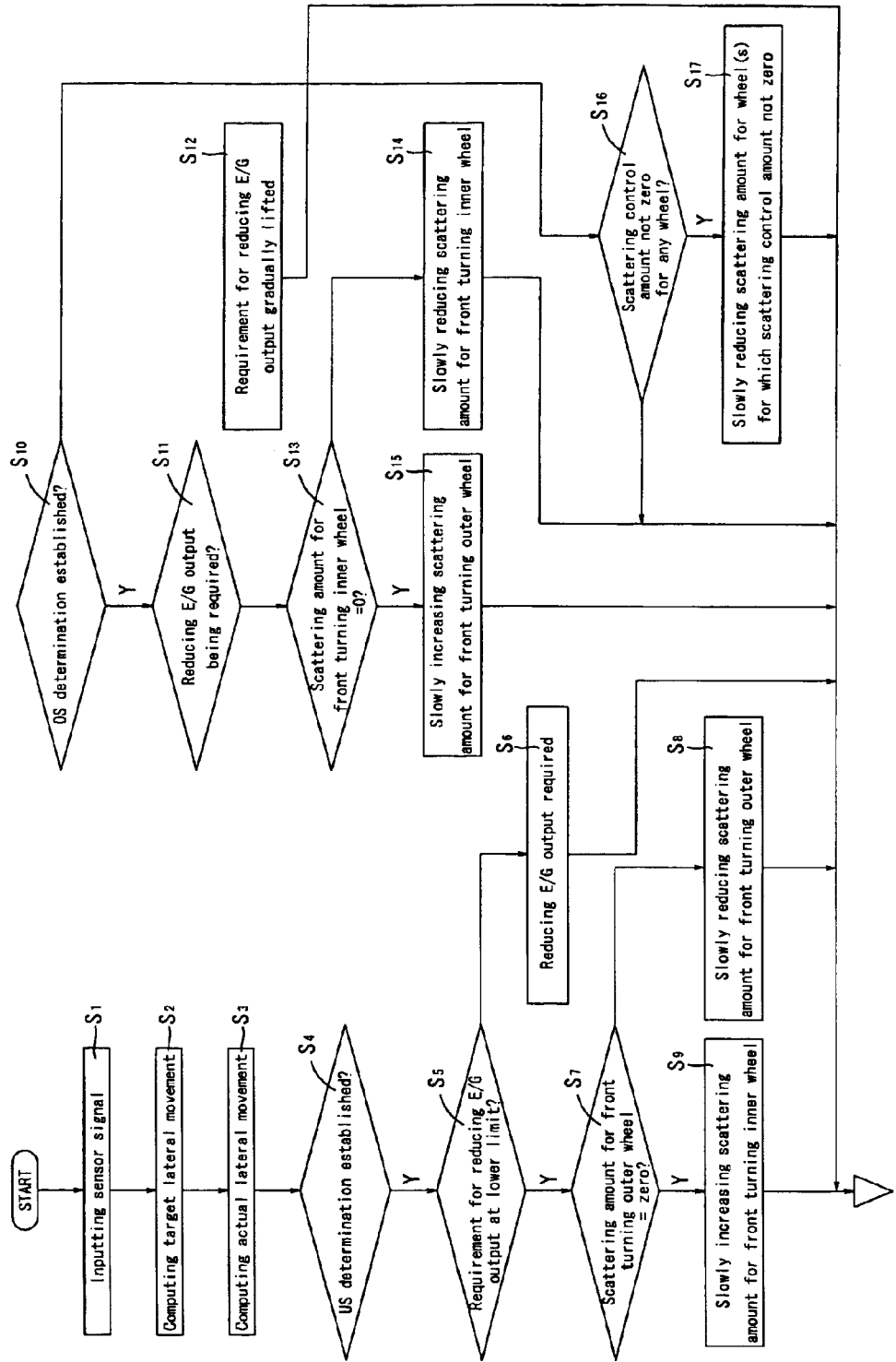
FIG. 13 is a flowchart showing the operation of the same.

The controller 20, which includes the program for TRC control, carries out cooperative control with TRC control by carrying out the lateral movement control as follows. This cooperative control will be described with reference to the flowchart of FIG. 13. When the engine is started and the vehicle begins traveling, in $S_1$, input signals from the wheel speed sensors 21 ($S_1$–$S_4$), steering angle sensor 22 ($S_H$) and yaw rate sensor 23 (Y) are sent to the controller 20 where the wheel speeds, vehicle speed, steering angle and yaw rate are computed and detected. In $S_2$, the value of the target lateral movement (turning angular speed) is computed from the values of the wheel speeds and steering angle. In $S_3$, the value of the actual lateral movement is calculated from input signals from the yaw rate sensor 23.

By determining the deviation between the target lateral movement value and the actual lateral movement value, determination is made in $S_4$ as to whether or not the US tendency is over a predetermined level from the value of the deviation. If the actual lateral movement is smaller than the target lateral movement, steering is insufficient. Thus determination of US tendency is made and cooperative control with TRC is carried out in $S_5$ and the following steps. In $S_5$, determination of required value of reduction of the engine (E/G) output is made. Unless the output value is at the lower limit, requirement for reduction of the E/G output is given in $S_6$. This is repeated (TRC control). When the E/G output reaches the lower limit, in $S_7$, the set value of scattering amount of the particulates by the frictional force adding means 10 for the front turning outer wheel is determined.

In the determination in $S_7$, the scattering amount is initially zero. Thus in $S_9$, the scattering amount for the front turning inner wheel is slowly increased. By blowing out while increasing the scattering amount for the turning inner wheel, the friction coefficient $\mu$ of the tire of the turning inner wheel is recovered and the frictional force increases, so that the US tendency disappears. On the other hand, if scattering has been made for the front turning outer wheel e.g. due to the fact that it was determined in an OS tendency previously, it proceeds $S_7 \rightarrow S_8$, where the scattering amount for the front turning outer wheel is slowly reduced. Thus, the frictional force of the front turning outer wheel decreases, so that the US tendency disappears.

If in the determination in $S_4$, determined not US, in $S_{10}$ and subsequent steps, determination of OS tendency is made. If determined OS, the following cooperative control is carried out in $S_{11}$ and subsequent steps. If determined OS, since the E/G output reducing requirement is immediately carried out in TRC control, the determination in $S_{11}$ will be YES. In $S_{12}$, a control signal for gradually lifting the E/G output reducing requirement is set to the E/G. This is repeated. When the output of the E/G output reducing requirement ends, in $S_{13}$ and subsequent steps, the scattering amount of particulates is adjusted.

In $S_{13}$, determination is made about the scattering amount for the front turning rear wheel. If scattered, first in $S_{14}$, a control signal for slowly reducing the scattering amount for the turning inner wheel is given. This is repeated. When the scattering amount becomes zero, in $S_{15}$, the scattering amount for the front turning outer wheel is slowly increased.

Thus, the friction coefficient $\mu$ at the turning outer wheel is recovered, and the frictional force increases, so that the OS tendency disappears. If it is neither US nor OS tendency, that is, both steering and acceleration at the start are proper, and no lateral movement such as turning due to slip is developing, there is no need for TRC control or lateral movement control. Thus, in $S_{16}$, checking is made as to whether or not there is any wheel for which the scattering control amount is not zero, and for any wheel for which the scattering control amount is not zero, the scattering amount is slowly reduced. When the scattering amount becomes zero for all the wheels, control ends. This control is repeated.

Figure 14:
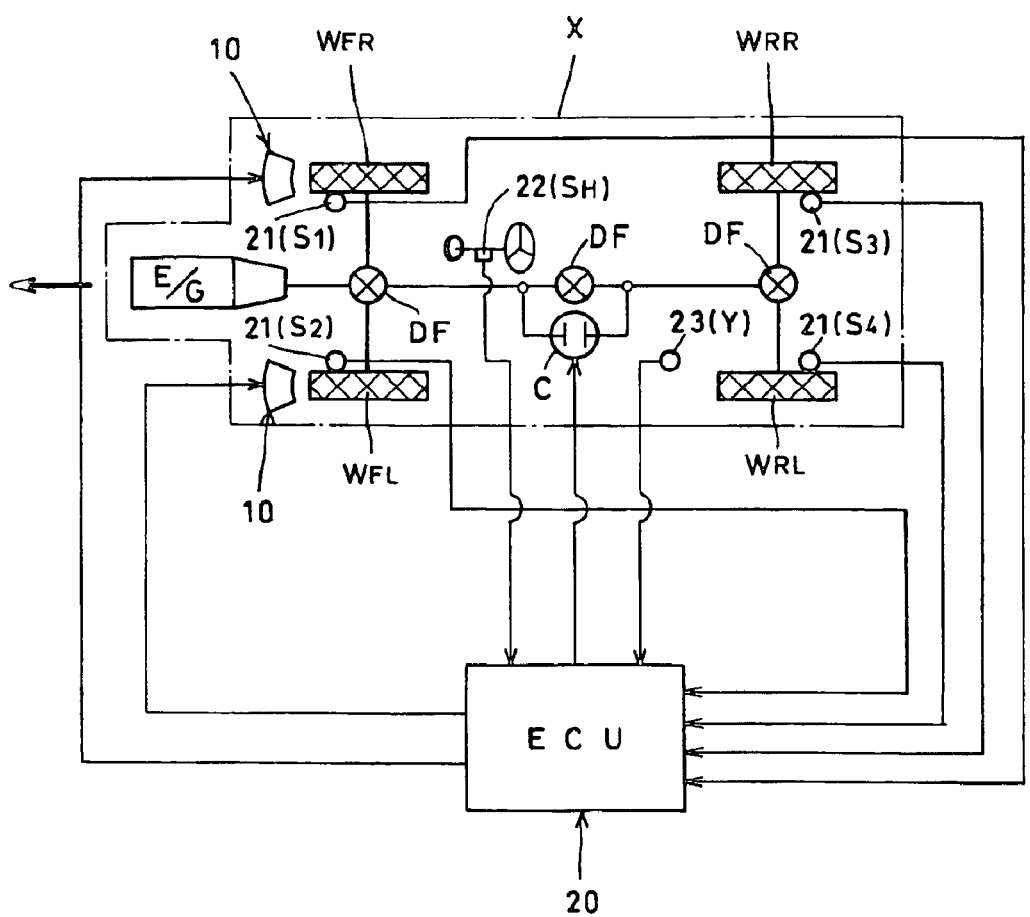
FIG. 14 is a schematic diagram of the lateral movement stabilizing device of a sixth embodiment.
Figure 15:
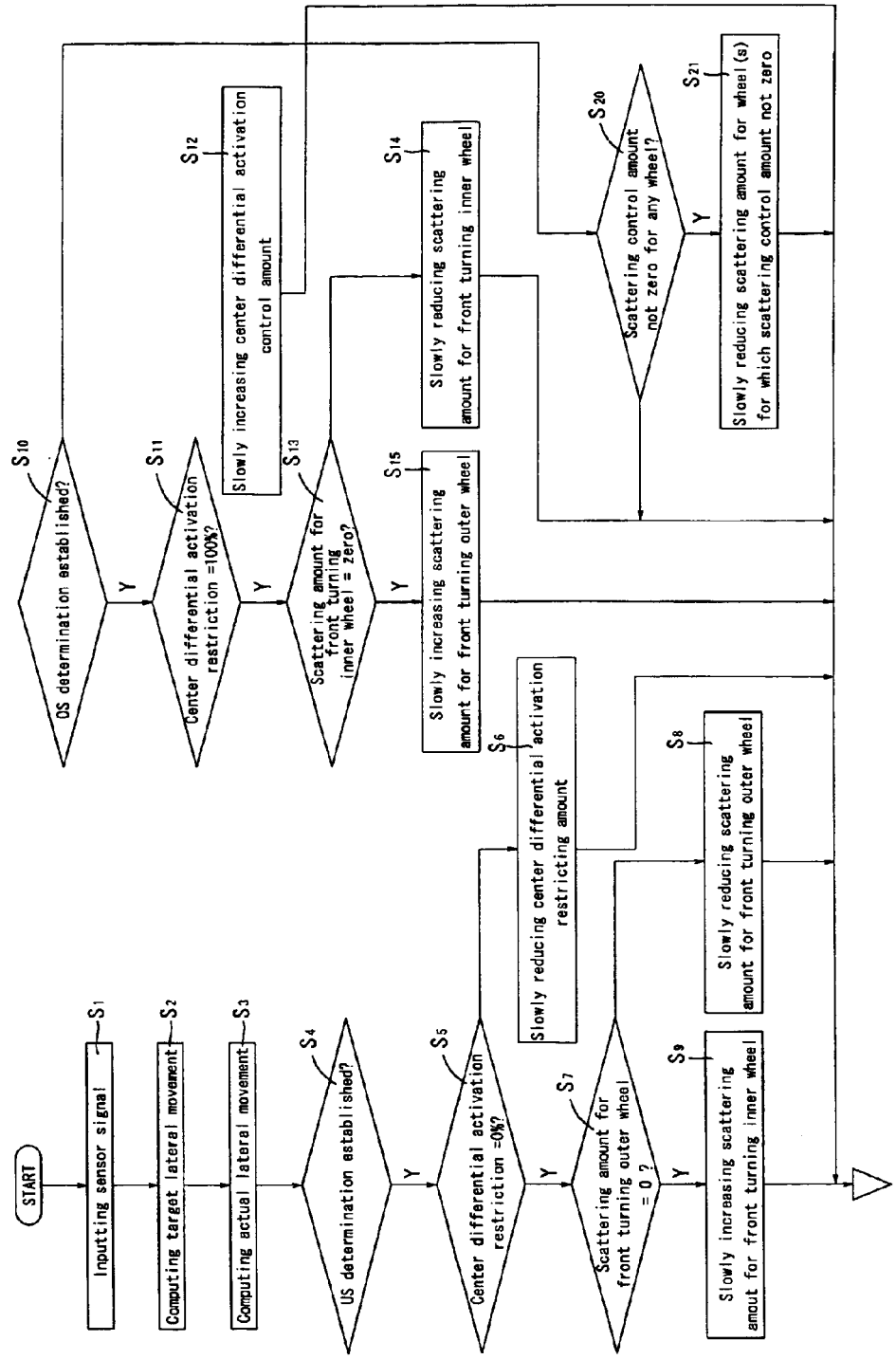
FIG. 15 is a flowchart showing the operation of the same.

FIG. 14 shows a schematic diagram of the lateral movement control device of the sixth embodiment. This embodiment is an example in which cooperative control is carried out by applying the lateral movement control device to 4WD control of a 4WD vehicle. In this embodiment, it is of a type in which a full-time 4WD is used and torque distribution is a center differential limiting type. In FIG. 14, DF shows a differential gear and C shows a multiple disk clutch. If a rotational difference develops between the front and rear wheels during travel, while this difference is small, a center differential carries out differential. If it is large, the clutch is activated to limit the differential so that torque will be distributed at an optimum rate to the front and rear wheels. Thus, 4WD control in this case is made such that the differential limiting amount for the center differential is controlled.

As shown, one frictional force adding means 10 is provided for each of the front two wheels. Connection is made such that to the controller 20, input signals from the wheel speed sensors 21 ($S_1$–$S_4$), steering angle sensor 22 ($S_H$) and yaw rate sensor 23 (Y) are sent, and from the controller 20, control signals are independently sent to the respective frictional force adding means 10, and control signals are sent to the clutch C of the center differential.

When the engine is started and travel begins, in $S_1$, input signals from the sensors are sent to the controller 20. In the controller 20, the wheel speeds, the vehicle travel speed and the steering wheel steering angle $\theta$ are computed. In $S_2$, the target lateral movement value is computed from the wheel speeds and the steering wheel steering angle. In $S_3$, based on the signal from the yaw rate sensor 23, the actual lateral movement value is computed. And from the degree of deviation between the calculated target lateral movement value and the actual lateral movement value, determination is made as to whether US or OS.

In $S_4$, US determination is made. If determined to be in a US tendency, in $S_5$ and subsequent steps, differential restriction of the center differential is released. This is to reduce the restricting force of the center differential because in a US tendency, steering is insufficient. In the determination in $S_5$, if the previous control state of the center differential is not 0%, the differential restricting amount of the center differential is slowly reduced in $S_6$ by 4WD control. This control is repeated. When the differential restriction becomes 0% (differential restriction lifted), in $S_7$ and subsequent steps, by a lateral movement controller, the amount of particulates scattered by the frictional force adding means 10 is adjusted.

In $S_7$, the scattering amount for the front turning outer wheel is determined. Since the scattering amount is zero at first, it proceeds to $S_9$ where control is made such that the scattering amount for the front turning inner wheel will slowly increase. This increases the driving force to the turning inner wheel and increases the turning moment of the vehicle. Thus it is possible to carry out cooperative control with the 4WD control. On the other hand, if it was determined in an OS tendency previously and scattering for the front turning outer wheel has already been carried out, it proceeds to $S_8$ where control is made so that the scattering amount for the front turning outer wheel will decrease slowly. Thus, the driving force to the front turning outer wheel decreases, so that the US tendency is relaxed.

If the determination in $S_4$ is NO, it proceeds to $S_{10}$ to determine as to OS. If in $S_{10}$, it is determined in an OS state, in $S_{11}$ and subsequent steps, differential restriction of the center differential is carried out to increase the restricting force of the center differential. First, in the determination in $S_{11}$, if the differential restriction is not 100%, in $S_{12}$, the differential restricting amount of the center differential is slowly increased. This is repeated until the differential restricting amount reaches 100%. If the differential restriction reaches 100%, no further control is possible with the center differential. Thus it proceeds to $S_{13}$ to adjust the particulate scattering amount.

In the determination in $S_{13}$, since the scattering amount for the front turning inner wheel is initially zero, in $S_{15}$, control is made to slowly increase the scattering amount for the front turning outer ring. This is repeated. By increasing the scattering amount for the turning outer wheel, braking with increased friction coefficient $\mu$ of the turning outer wheel for the road surface is carried out. This relaxes the OS tendency. On the other hand, if determined US tendency previously and scattering was already made for the front turning inner wheel, the determination of $S_{13}$ will be negative, and it proceeds to $S_{14}$ where the scattering amount for the front turning inner wheel is slowly reduced, thereby relaxing the OS tendency.

If the determination in $S_{10}$ is NO, since it is neither US nor OS, steering is proper, and 4WD control is also proper. Thus control is unnecessary. Thus in $S_{20}$, determination is made as to whether or not there is any wheel for which the scattering control amount is not zero. If there is a wheel for which it is not zero, control for slowly reducing the scattering amount is carried out. If there is not, control ends. This control is repeated at predetermined intervals. Thus, in the 4WD control in which control of the center differential is carried out, if the control limit of restricting force is exceeded, control for increasing the frictional force is carried out for cooperative control with lateral movement control.

In the above embodiments, for the lateral movement evaluating portion, a yaw rate sensor and a steering angle sensor are used. But it is not limited thereto. For example, a lateral G sensor may be added. Also, in the 1st, 4th, 5th and 6th embodiments, when the vehicle is in a US tendency, the frictional force for the front turning inner wheel is increased. But the frictional force adding means may be provided for the four wheels to increase the frictional force for the rear turning inner wheel.

In the above embodiments, description has been made about a lateral movement stabilizing device having the frictional force adding means 10 and the controller 20 alone, or a device which carries out cooperative control with one of ABS control, VSC control, TRC control and 4WD control. But it is needless to say that a vehicle movement stabilizing device can be formed which has a program for carrying out all of the above controls in the controller 20 to stabilize all the movements including lateral movement.

As described in detail, the vehicle lateral movement stabilizing device of this invention has frictional force adding means for increasing the frictional force to the road surface, and a controller for controlling the frictional force adding means based on signals of sensors for detecting movement and turning, and controls lateral movement in a stable state with the determination by an evaluating portion for evaluating lateral movement. Thus, while lateral movement stabilizing control was impossible with a conventional device if the friction coefficient is extremely small, even in such a state, lateral movement can be stabilized by improving the turnability of the vehicle.

What is claimed is:

1. A vehicle lateral movement stabilizing device comprising frictional force adding means having an actuator and an actuated member for increasing the frictional force of wheels to a road surface by driving said actuated member by said actuator, various sensors or switches including wheel speed sensors, for detecting signals indicating movement and/or turning of the wheels or the vehicle, a controller for controlling the actuation of said actuator based on signals from said sensors, said controller including a lateral movement evaluating portion for calculating by computing values indicating a lateral movement state including movement and turning of the vehicle based on detection signals from said sensors, determining whether the lateral movement value is not less than or not more than a predetermined reference value, and evaluating the lateral movement, said controller sending a control signal based on the results of evaluation to said frictional force adding means to increase the frictional force, whereby controlling the lateral movement in a stable state, and wherein said frictional force adding means are provided for all of the front two and rear two wheels, and wherein if said lateral movement evaluating portion determines that the vehicle is in an understeer (US) tendency, a control signal is sent to the frictional force adding means for the front two wheels and if it determines that the vehicle is in an oversteer (OS) state, a control signal is sent to the frictional force adding means for the rear two wheels to increase the friction coefficient $\mu$.

2. A vehicle lateral movement stabilizing device comprising a first control means for controlling wheel braking force during braking of a vehicle, such as an ABS, and a second control means for controlling frictional engagement between wheels and a road surface, whereby controlling the lateral movement of the vehicle by cooperatively controlling said first control means and said second control means.

3. A vehicle lateral movement stabilizing device comprising a first control means for controlling wheel driving force during acceleration of a vehicle, such as a TRC, and a second control means for controlling frictional engagement between wheels and a road surface, whereby controlling the lateral movement of the vehicle by cooperatively controlling said first control means and said second control means.

4. A vehicle lateral movement stabilizing device comprising a first control means for controlling distribution of the driving force to front and rear wheels during turning of a vehicle, and a second control means for controlling frictional engagement between wheels and a road surface, whereby controlling the lateral movement of the vehicle by cooperatively controlling said first control means and said second control means.

5. A vehicle lateral movement stabilizing device as claimed in claim 1 wherein said controller comprises an ABS controller for ABS-controlling braking force based on input signals from said wheel speed sensors, and a lateral movement controller for controlling said frictional force adding means based on input signals from said wheel speed sensors, and wherein said device evaluates the lateral movement by determining that friction coefficients $\mu$ are different on the right and left sides from a predetermined set values, and based on this evaluating determination, actuates said frictional force adding means on a low-$\mu$ side more strongly than said frictional force adding means on a high-$\mu$ side.

6. A vehicle lateral movement stabilizing device as claimed in claim 1 wherein said frictional force adding means is provided, and wherein said controller comprises a traction controller for controlling acceleration at the start of travel and turnability based on input signals from a sensor for detecting lateral movement of the vehicle to ensure stability of travel, and a lateral movement controller for controlling said frictional force adding means based on input signals from said sensors, and wherein said device determines by computing a target lateral movement value and an actual lateral movement value based on signals from said sensors, evaluates lateral movement according to whether the deviation between said target lateral movement value and said actual lateral movement value is not less than or not more than a predetermined value, and reduces the output of an engine or lift the reduction based on the evaluation, and actuates said frictional force adding means for the corresponding wheel.

7. A vehicle lateral movement stabilizing device as claimed in claim 1 wherein said frictional force adding means is provided, and wherein said controller comprises a 4WD controller for carrying out 4WD control by controlling a differential restricting amount to a center differential or a torque transmitting amount between the front and rear wheels based on input signals from a sensor for detecting lateral movement of the vehicle, and a lateral movement controller for controlling said frictional force adding means based on input signals from said sensors, and wherein said device determines by computing a target lateral movement value and an actual lateral movement value based on signals from said sensors, evaluates lateral movement according to whether the deviation between said target lateral movement value and said actual lateral movement value is not less than or not more than a predetermined set value, and reduces or increases the differential restricting amount of the center differential or the torque transmitting amount between the front and rear wheels, and actuates said frictional force adding means for the corresponding wheel.

8. A vehicle movement stabilizing device comprising a travel assisting means which, at the start of a vehicle, or during travel or braking for stopping, through brake means for braking the rotation of wheels and an output adjusting portion for adjusting the engine output, effectively actuates various operations by controlling braking or braking and the engine output, frictional force adding means having an actuator and an actuated member for increasing frictional force and driving said actuated member by said actuator to increase the frictional force of the wheels to a road surface, and a controller for controlling the operation of said travel assisting means and said frictional force adding means, said controller including an evaluating portion for determining whether or not it exceeds a movement limit value for effectively actuating the respective movements by said travel assisting means, based on the friction coefficient of the wheels to the road surface during each movement, and actuating said frictional force adding means if it determines that the movement limit value is exceeded.

* * * * *